United States Patent [19]
Dittenhofer

[11] Patent Number: 5,632,560
[45] Date of Patent: May 27, 1997

[54] ECCENTRIC BEARING

[75] Inventor: Thomas Dittenhofer, Dittelbrunn, Germany

[73] Assignee: SKF GmbH, Schweinfurt, Germany

[21] Appl. No.: 602,657

[22] Filed: Feb. 16, 1996

[30] Foreign Application Priority Data

Feb. 17, 1995 [DE] Germany ............... 295 02 630.8

[51] Int. Cl.⁶ .................................................. F16C 19/50
[52] U.S. Cl. ........................... 384/447; 384/461; 384/504
[58] Field of Search .................................. 384/447, 461, 384/455, 504, 505, 517, 563, 536, 582

[56] References Cited

U.S. PATENT DOCUMENTS

| | | |
|---|---|---|
| 2,518,159 | 8/1950 | Martin ...................... 384/461 |
| 2,979,367 | 4/1961 | Mims et al. |
| 3,606,502 | 9/1971 | De Germond ............ 384/504 X |
| 4,580,757 | 4/1986 | Dobhan et al. ............ 249/88 |
| 4,834,560 | 5/1989 | Jacob et al. .............. 384/461 |
| 4,925,322 | 5/1990 | Hishida ................... 384/505 X |
| 5,074,680 | 12/1991 | Hoch et al. ............... 384/560 |

*Primary Examiner*—Thomas R. Hannon
*Attorney, Agent, or Firm*—Rosen, Dainow & Jacobs, L.L.P.

[57] ABSTRACT

An eccentric bearing having three bearing races arranged one over another, of which one with the center ring forms an inner rolling bearing and the other with the center ring forms an outer rolling bearing, wherein the center ring in each instance consists of a bearing ring insert for of each of said two rolling bearings and a supporting ring of castable or injectable plastic between and positioning said bearing ring inserts.

2 Claims, 1 Drawing Sheet

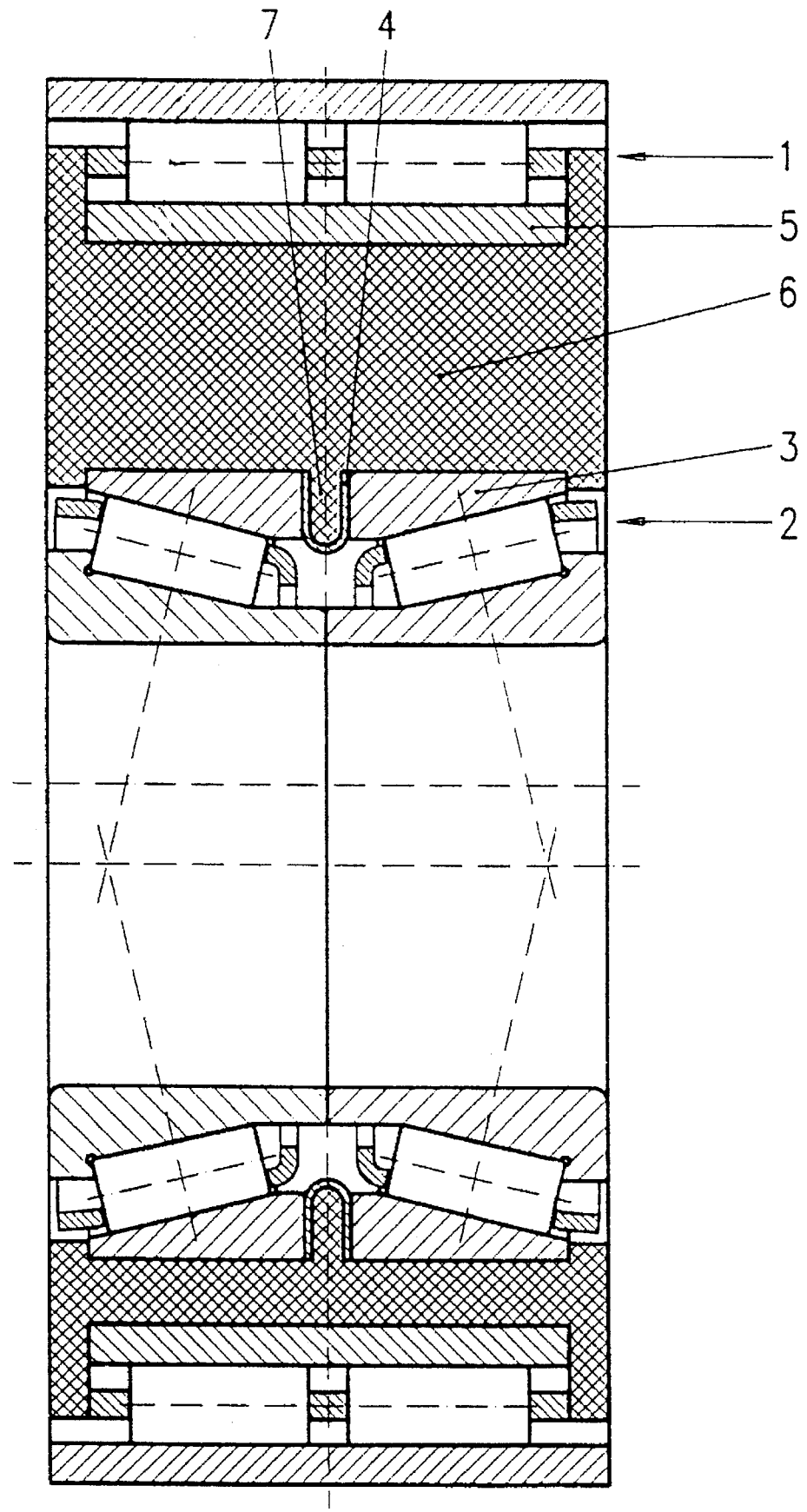

ECCENTRIC BEARING

BACKGROUND OF THE INVENTION

The invention concerns an eccentric bearing having three bearing races arranged one over another, of which one with the center ring forms an inner rolling bearing and the other with the center ring forms an outer rolling bearing.

A sturdy center ring with built-in races is used in a bearing such as that according to DE 3,912,449. In this prior art embodiment the center ring must therefore always be adapted to the respective application with close tolerances. Although there is no fault to be found with the function of the known eccentric bearing, there are still opportunities for the reduction of manufacturing costs.

SUMMARY OF THE INVENTION

The object of the invention is to procure an eccentric bearing of the type mentioned at the beginning wherein manufacture of the center ring is simpler and less costly.

This object is accomplished by the center ring in each instance to consist of bearing ring inserts for the two rolling bearings and a supporting ring of castable or injectable plastic positioning the latter. Standard bearing races with concentric surfaces and bore surfaces, which may be produced by the normal conventional method, are used in manufacture of the center ring. Nothing stands in the way of the use of standardized bearing races when special spatial conditions do not require reduction of wall thickness. Because of that, in principle two rolling bearings taken from the standard series may be used. They are placed eccentrically in one another and affixed to one another by injection of a supporting or connecting ring.

These and additional features are described below by means of the example represented in the drawing.

BRIEF DESCRIPTION OF THE DRAWING

FIG. 1 is a sectional view of the eccentric bearing of this invention.

DETAILED DESCRIPTION OF THE PREFERRED EMBODIMENT

The single FIGURE shows an eccentric bearing with an outer, double-row cylindrical roller bearing 1 and an inner double-row tapered roller bearing 2 in O arrangement. The latter is provided with two separate outer rings 3, which are braced or urged axially by a bellows-shaped spring element 4 and thus adjusted free from play. The tapered roller bearing 2 as well as the cylindrical roller bearing 1 have standard concentrically manufactured bearing races.

In the form represented, the two fabricated rolling bearings 1, 2 were positioned eccentric to one another in an injection mold, not shown, and a supporting ring 6 of polymeric material injected between the inner ring 5 of the cylindrical roller bearing 1 and the outer rings 3 of the tapered roller bearing 2.

After thorough hardening the two rolling bearings 1, 2 were connected and affixed together in final form. Plastic material was then forced into the U-shaped cross section 7 of the spring element 4 and thus fixes the mutual position of the two outer rings 3 of the tapered roller bearing 2 to one another. This results in an tapered roller bearing 2 free from play and independent of finishing tolerances.

The cylindrical bearing 1 can be replaced by a second tapered bearing adjusted with another spring element 4 as disclosed herein.

I claim:

1. An eccentric bearing having three bearing races arranged one over another, of which one with the center ring forms an inner rolling bearing and the other with the center ring forms an outer rolling bearing, characterized in that the center ring in each instance consists of a bearing ring insert for of each of said two rolling bearings and a supporting ring of castable or injectable plastic between and positioning said bearing ring inserts.

2. An eccentric bearing according to claim 1, characterized in that one of the rolling bearings is a double-row tapered bearing in O or X arrangement with separate tapered bearing ring inserts which, before injection of the supporting ring, are adjusted free from play by a spring element and then fixed.

* * * * *